United States Patent [19]

Bieri

[11] 4,043,311

[45] Aug. 23, 1977

[54] JIG SAW BLADE WITH COOLING CHANNEL

[76] Inventor: Hans Bieri, Toedistrasse 9, 8330 Pfaeffikon, Switzerland

[21] Appl. No.: 623,895

[22] Filed: Oct. 20, 1975

[30] Foreign Application Priority Data

Oct. 24, 1974 Switzerland .................... 14227/74

[51] Int. Cl.² .............................................. B28D 1/06
[52] U.S. Cl. ........................................ 125/18; 51/267
[58] Field of Search ..................... 51/267; 125/15, 18

[56] References Cited

U.S. PATENT DOCUMENTS

| 3,176,675 | 4/1965 | Bomba | 125/15 |
| 3,196,584 | 7/1965 | Tatko | 125/15 X |

Primary Examiner—Harold D. Whitehead
Attorney, Agent, or Firm—W. G. Fasse; W. W. Roberts

[57] ABSTRACT

The present jig saw blade is constructed for heavy duty work, such as cutting through concrete or masonry. For this purpose, the blade is provided with a cooling channel extending longitudinally through the length of the blade and branch channels extend laterally through the body of the blade from a narrow side thereof and into the longitudinal channel. The lower end of the longitudinal channel is closed and the upper end is arranged for connection to a cooling fluid supply.

11 Claims, 3 Drawing Figures

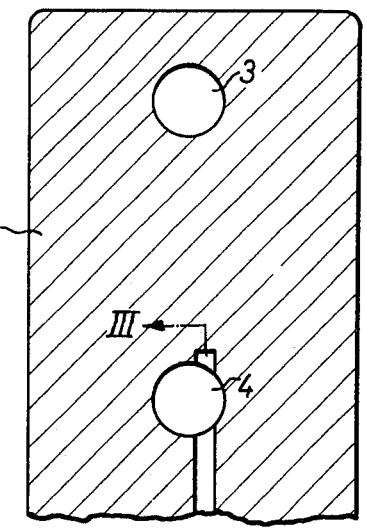
Fig.1
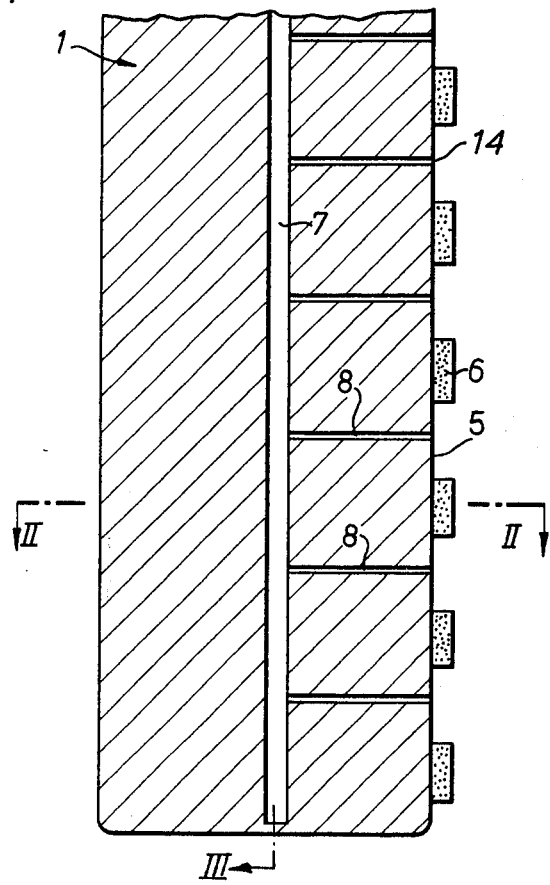

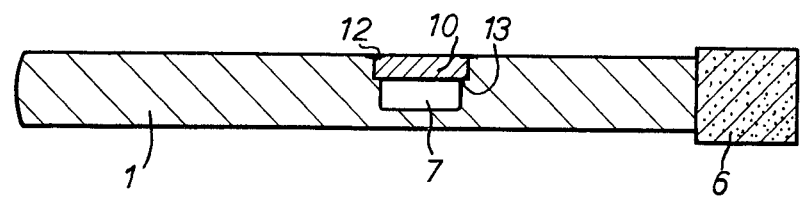
Fig. 2
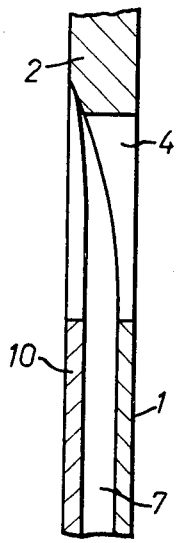
Fig. 3

4,043,311

JIG SAW BLADE WITH COOLING CHANNEL

BACKGROUND OF THE INVENTION

The present invention relates to a jig saw blade, especially for heavy duty work, such as sawing through hard materials, for example, building walls of concrete or masonry. Such blades are conventionally provided with hard metal or diamond inserts along their cutting edge. The invention also relates to a method of producing a heavy duty jig saw blade.

Substantial difficulties have been encountered heretofore in the proper cooling of heavy duty jig saw blades, which are used for cutting holes into concrete walls or the like. On the one hand it is desirable to operate the jig saw with a high cutting speed to keep the time necessary for producing a certain cutting length as small as possible. On the other hand it has been difficult to avoid the large heat generation resulting from increasing cutting speeds. Such heat generation may be so high that the saw blade will eventually be destroyed. The supply of cooling water to the upper end of a jig saw blade has been found to be insufficient, because the cooling water does not reach those parts of the blade remote from the tool holder head, because of evaporation.

Further, the supply of a cooling medium to the outside of the blade is usually not effective when the blade extends horizontally to cut a slot into a vertical wall. Another difficulty in providing an efficient cooling is seen in that the saw blade has a rather narrow dimension across the cutting direction to keep the slot to be cut narrow. This given shape of jig saw blades makes it impossible to secure a hose or the like to the blade for supplying a cooling liquid as is possible in connection with rotating tools.

OBJECTS OF THE INVENTION

In view of the foregoing, it is the aim of the invention to achieve the following objects singly or in combination:

to avoid the drawbacks of the prior art, specifically to provide an efficient cooling for jig saw blades regardless of the instantaneous operating position of such blades;

to place the cooling channels for a cooling medium into the body of the saw blade and to guide the cooling medium to a plurality of spots along its cutting edge; and to effectively cool the jig saw blade along its entire length, while simultaneously providing a lubrication for the blade in operation.

SUMMARY OF THE INVENTION

According to the invention there is provided a jig saw blade with a cooling channel extending substantially the entire length inside the blade shaft. The channel is preferably closed at the free end of the blade shaft, and a plurality of branch channels extend from the longitudinal main channel outwardly, preferably toward the cutting edge of the blade shaft. Each of the branch channels has a cross sectional area smaller than the main channel, which is common to all of the branch channels. The cutting inserts along the cutting edge of the blade are spaced from each other, and the outlet ports for the branch channels are preferably arranged in the spacings between adjacent cutting inserts.

A jig saw blade according to the invention has the advantage that the cooling medium such as water, air or the like is supplied to the blade along its entire length, and especially also along the cutting edge to provide an efficient cooling and/or lubrication. In addition, the slender channel inside the blade does not appreciably increase the width of the blade perpendicularly to the cutting direction. Moreover, since the slender cooling channel extends substantially coaxial with the longitudinal axis of the saw blade, the reduction of the bending stiffness of the blade in the feed advance direction is minimal and does not have any practical effect.

BRIEF FIGURE DESCRIPTION

In order that the invention may be clearly understood, it will now be described, by way of example, with reference to the accompanying drawings, wherein:

FIG. 1 shows a longitudinal sectional view through a jig saw blade according to the invention;

FIG. 2 is a sectional view through the blade along the section line II—II in FIG. 1; and FIG. 3 is a sectional view through the blade along section line III—III in FIG. 1.

DETAILED DESCRIPTION OF PREFERRED EXAMPLE EMBODIMENTS

The saw blade 1 is intended for use in a jig saw for cutting hard materials, such as building walls or concrete or masonry and the like. The cutting depth may extend up to 1 meter. The upper end 2 of the saw blade is constructed as a connection head to secure the blade to the drive shaft of a jig saw, not shown. For this purpose two connecting holes 3, 4 are located in the connecting head 2 and extending through the saw blade from one wider side to the opposite wider side. The connecting holes 3 and 4 are arranged in the central longitudinal axis of the blade shaft and spaced one above the other. This symmetrical arrangement of the connecting holes makes it possible to use the same blade selectively for a left or right cut. The blade is made of high alloyed steel, such as tool steel.

One narrow edge 5 of the blade shaft 1 is formed as the cutting edge which comprises a plurality of hard material cutting elements 6 made of hard metal or of sinter particles having embedded therein diamond splinters. The cutting elements 6 are spaced from each other along the length of the cutting edge 5 and may be secured to the cutting edge by conventional means, for example, by brazing. These elements 6 may also be formed as inserts brazed to the cutting edge 5. The cutting elements 6 have a lateral width somewhat larger than the thickness of the blade shaft 1 across the cutting direction. Thus, the cutting elements will laterally protrude from the shaft proper. Instead of making the individual cutting elements thicker than the thickness of the shaft across the cutting direction, it is possible to alternately displace the cutting elements 6 somewhat in the lateral direction so that one row of cutting elements will laterally protrude from one side of the shaft, while the other group will protrude from the opposite side of the shaft.

A cooling channel 7 extends centrally through the length of the shaft substantially from the connecting hole 4 down to the free end of the shaft 1. The lower end of the channel 7 is preferably closed. Branch channels 8 extend laterally from the main channel 7 to outlet ports 14 which preferably are located between adjacent cutting elements 6. It would also be possible to place the outlet ports 14 laterally adjacent the cutting element 6. All the branch channels 8 merge into the main channel 7. This main channel 7 extends substantially in parallel to the saw blade longitudinal axis and the upper end of the channel 7 connects off-center to the hold 4 for the supply of cooling medium. For this purpose, a nipple, not shown, may simultaneously serve as the connecting bolt for securing the upper head 2 of the saw blade shaft 1 to a drive shaft in the jig saw. The nipple is provided with a shoulder or flange at one end thereof and an outer thread at the opposite end thereof. In addition, the nipple is provided with a longitudinal dead end hole, as well as with lateral holes connecting the channel 7 to a supply hose which in turn would be screwed to the outer threaded end of the nipple. The outer threaded end of the nipple is long enough for properly securing the saw blade to the drive shaft. The hose connecting the channel 7 through the nipple to a supply of cooling medium should be sufficiently flexible to follow the reciprocating movement of the saw blade.

The cross sectional area of the branch channels 8 is substantially smaller than the cross sectional area of the channel 7. Preferably, the cross sectional area of any of the channels 8 corresponds to less than one quarter of the cross sectional area of the channel 7. Moreover, the ratio between the diameter of the channels 8 and the width of the cutting elements 6 should be within the range of 1 to 8 to 1 to 3, preferably the ratio should be 1 to 5.

The present saw blade is manufactured according to the invention by milling a groove forming the channel 7 into the shaft 1, thereby simultaneously milling the shoulder 13 as shown in FIG. 2. This groove ends at its upper end in the hole 4 and the ends of the groove may have a curved shape in accordance with the milling tool. In any event, the lower end of the groove stops somewhat above the end of the shaft, as best seen in FIG. 3. A cover 10 fitting into the groove above the shoulders 13 is then inserted into the groove and tightly welded to the body of the shaft 1 by welding seams 12 extending the entire length of the cover. The thickness of the cover 10 corresponds to the depth of the groove above the shoulders 13. Thus, the channel 7 is formed having a width in the cutting direction larger than its thickness across the cutting direction. Thus, the channel 7 extends inside the shaft 1 in a symmetrical position relative to a plane extending longitudinally through the shaft 1 and in the cutting direction. The cover 10 is secured to the body of the shaft 1 by welding as mentioned, however, without use of additonal welding material. In other words, the welding is of the fusion welding type for closing the channel 7 in a liquid tight manner.

It is preferable to drill the branch channels 8 prior to closing the main channel 7 with the cover 10, because in this manner the channel may be easily cleaned from any milling and drilling chips and dust.

Subsequent to the drilling of the branch channels 8, the main channel 7 is closed with cover 10 and in fluid communication with the outlet ports 14. Thereafter, the cutting elements 6 are secured to the cutting edge intermediate the outlet ports 14, for example, by brazing or the like.

By employing the above manufacturing method according to the invention, it is possible to locate the channel 7 in such a position that it will be substantially in and around the neutral axis of the shaft 1 relative to bending loads resulting from the feed advance of the jig saw blade in operation. In addition, the just described method avoids drilling the channel 7 longitudinally. This is an important advantage, because longitudinal drilling, especially for substantial lengths might tend to locate the drill channel off-center.

The present saw blade may be produced for cutting depths ranging from about 400 mm to about 900 mm with a width in the cutting direction of about 58 mm and a thickness across the cutting direction of about 5 to 6 mm. A practical spacing from center to center between adjacent cutting elements 6 may be about 50 mm. As mentioned, the blade shaft will be made of high alloyed steel, such as tool steel.

Although the invention has been described with reference to specific example embodiments, it will be appreciated, that it is intended to cover all modifications and equivalents within the scope of the appended claims.

What is claimed is:

1. A cutting blade comprising an elongated blade shaft having a mounting end for mounting in a jig saw and a free end on the end thereof opposite said mounting end, said blade shaft having a pair of opposed longitudinally extending sides joined by at least one longitudinally extending edge, whereby said shaft has a neutral axis extending longitudinally in said blade with respect to bending loads, a channel exposed on only one side of said blade and extending substantially symmetrically along said neutral axis, cutting means comprising a plurality of longitudinally spaced apart cutting inserts secured to said one edge of said blade, a plurality of bores extending within said blade, said bores having outlet ports in said edge between pairs of adjacent inserts and extending to said channel, a cover sealingly inset in said one side of said blade and covering said channel, said channel being closed at the free end of said blade, and cooling medium supply means for directing a fluid into the end of said channel at said mounting end of said blade.

2. The cutting blade according to claim 1, wherein each of said bores has a smaller cross-sectional area than said channel.

3. The cutting blade according to claim 1, wherein said outlet ports are located adjacent to said inserts.

4. The cutting blade according to claim 1, wherein said cooling medium supply means comprises a bore through the blade shaft and through said channel at the mounting end of said blade shaft.

5. The cutting blade according to claim 1, wherein said channel has a rectangular cross section.

6. The cutting blade according to claim 5, wherein said channel has a longitudinal shoulder along each side thereof, said cover resting on said shoulders, and tight, sealing welding seams securing said cover to said blade shaft.

7. The cutting blade according to claim 1, wherein said bores are located in the plane of symmetry of said blade shaft.

8. The cutting blade according to claim 1, wherein each hole has a cross sectional area which is smaller than 25% of the cross sectional area of the channel.

9. The cutting blade of claim 1, wherein said blade shaft is a unitary element and has a second longitudinally extending edge opposite said one edge and joining said sides, said neutral axis extending symmetrically between said one and second edges, said cooling medium supply means comprising a mounting hole extending through said blade shaft at said mounting end, said channel intersecting said mounting hole.

10. The cutting blade of claim 9, wherein said channel intersects said mounting hole off center with respect to said mounting hole.

11. The cutting blade of claim 9, wherein said cover extends longitudinally of said blade only adjacent said channel, whereby tensile and compression forces on said blade shaft are not substantially transmitted to said cover.

* * * * *